United States Patent Office 3,562,266
Patented Feb. 9, 1971

3,562,266
QUATERNARY AMMONIUM HALIDES HAVING A 2-CHLORO CYCLOHEXYL OR 2-CHLORO ALKYL SUBSTITUENT
Francesco Minisci, Milan, and Remo Galli, Cremona, Italy, assignors to Montecatini Edison S.p.A., Milan, Italy, a corporation of Italy
No Drawing. Continuation of application Ser. No. 541,068, Apr. 8, 1966. This application May 26, 1969, Ser. No. 828,814
Int. Cl. C07d 87/30
U.S. Cl. 260—247
11 Claims

ABSTRACT OF THE DISCLOSURE

The present invention relates to quaternary ammonium halides having a chlorine atom on a carbon atom adjacent to that one bound to the nitrogen atom and represented by the formula

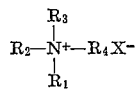

wherein X is a halogen selected from Cl, Br, I; $R_1$ and $R_2$ are alkyl or cycloalkyl, equal or different, saturated or unsaturated or together with the ammonium nitrogen form a heterocyclic ring; $R_3$ is an alkyl, containing a chlorine atom in the $\beta$ position in respect of the ammonium nitrogen; $R_4$ is an alkyl or an aralkyl; and $R_1$, $R_2$, $R_3$ and $R_4$ containing from 1 to 20 carbon atoms. Quaternary ammonium halides are useful as surfactants.

---

This is a continuation of application Ser. No. 541,068, filed Apr. 8, 1966, now abandoned, and relates to a process for the preparation of quaternary ammonium halides and to the products obtained thereby. The importance of the quaternary ammonium halides as pesticides and surfactants is known.

The quaternary ammonium halides of the present invention are useful as such.

Our invention has as an object a new method for obtaining quaternary ammonium halides, containing a chlorine atom on a carbon atom adjacent to that one bound to the nitrogen atom. In greater detail, our invention provides a process for the preparation of quaternary ammonium halides, represented by the formula:

(A) 

wherein X is a halogen selected from Cl, Br, I; $R_1$ and $R_2$ are alkyls or cycloalkyls, equal or different, saturated or unsaturated or form an heterocyclic ring together with the ammonium nitrogen; $R_3$ is an alkyl, containing a chlorine atom in the $\beta$ position in respect of the ammonium nitrogen; $R_4$ is an alkyl or an aralkyl group; each $R_1$, $R_2$, $R_3$ or $R_4$ group may contain from 1 to 20 carbon atoms.

According to our process, a dialkyl-N-chloramine of the type $R_1$—NCl—$R_2$ is reacted in a first step with an olefin, in the presence of catalysts based on ferrous, titaneous or cuprous salts, in order to obtain the tertiary amine of the type

which, after separation, is reacted in a second step with an alkyl halide of the type $R_4X$ in order to obtain the quaternary ammonium halide comprised in the Formula A. This process is of particular interest with long chain olefins and it can be applied also to mixtures of homologous olefins, which because of their low cost, are at present of great practical interest. The mixtures of the quaternary ammonium halides, which are obtained are usable as such. Furthermore, the present process is particularly convenient because of the simplicity of its realization, accessibility of raw materials, and high yields on the starting olefin and amine.

The principal starting materials are the secondary amines and the olefins. The secondary amines (dialkylamines having different structure, also cyclic amines such as piperidine and morpholine) are chlorinated with chlorine or alkali metal hypochlorites according to known methods. The dialkyl-N-chloramines, $R_1R_2N$—Cl, thus obtained, are mixed with the olefins, preferably in the presence of an organic solvent and are treated at temperatures comprised between $-20$ and $+50°$ C. with titaneous, ferrous, or cuprous salts. The organic solvent must be able to maintain, at least partially, the reactants in solution. Methanol is the preferred solvent, but mixtures of methanol and water or methanol and dioxane can also be employed. The reaction is carried out at atmospheric pressure; however, when using gaseous olefins, it is preferable to work under pressure, for instance up to 10 atm. An excess of olefin is used, which can be easily recovered and recycled.

The inorganic salt is used in an amount from 0.1 to 1 mol for each mol of chloramine. When a ferrous salt is used as the inorganic salt, it is desirable to use also some ferric chloride as this increases the yields. The reaction is instantaneous and goes essentially to give the addition of the dialkyl-N-chloramine to the double bond of the olefin (1) 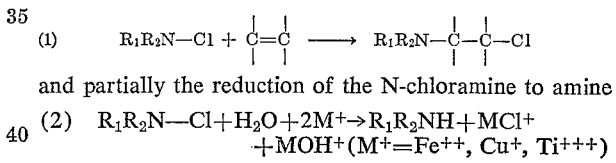

and partially the reduction of the N-chloramine to amine (2) $R_1R_2N$—Cl+$H_2O$+$2M^+$→$R_1R_2NH$+$MCl^+$
+$MOH^+$ ($M^+$=$Fe^{++}$, $Cu^+$, $Ti^{+++}$)

The reducing salt is consumed only in the amount necessary to reduce the N-chloramine to amine. The separation of the reaction products is carried out by acidification and separation of the unreacted olefin from the basic part; this last is liberated by alkali, the starting amine is then separated by distillation from the reaction product and is recycled. The unreacted olefin is also recycled. In the second step, the tertiary amine, obtained in the first step, and which is of the type

wherein the radical —$R_3$ is

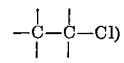

is treated with an alkyl halide, $R_4X$ in order to give a quaternary ammonium halide according to the reaction:

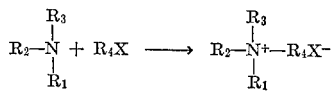

This operation is preferably carried out in the presence of a solvent, inert to the reactants and which dissolves them, e.g. an alcohol. The alkyl halide, $R_4X$ is preferably used in stoichiometric amount. The halogen of the alkyl halide must be more reactive than the chlorine present in the chlorinated amine. In practice, particularly reactive alkyl bromides or iodides, or chlorides, such as benzyl

EXAMPLE 1

Preparation of the chloride of 1-benzyl-1-(2-chloro-n-hexyl)-piperidinium

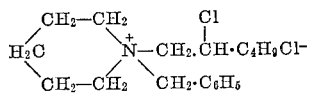

20 g. of N-chloro-piperidine, 30 g. of hexene-1 and 23 g. of hexahydrate ferric chloride are dissolved in 150 cc. of methanol and treated at a temperature between 0° and 5° C. with a methanol solution saturated with 35 g. of heptahydrate ferrous sulphate under agitation and under nitrogen. Methanol and the excess of hexene-1 (18.5 g.) are recovered by distillation, the residue is alkalized with a 10% solution of caustic soda, and 3 g. of piperidine together with 25 g. of N-2-chloro-n-hexyl-piperidine ($C_5H_5N-CH_2-CHCl-C_4H_9$) distilling at 84–5°/0.7 mm. Hg are obtained. 10 g. of the tertiary amine thus obtained and 12 g. of benzyl chloride in 50 cc. of ethanol are refluxed for 5 hours. After having removed the solvent and the excess of benzyl chloride under vacuum, 14.2 g. of 1-benzyl-1-1-(2-chloro-n-hexyl)-piperidinium chloride are obtained.

Under the same conditions and with the same yields, the 1-methyl-1-(2-chloro-n-hexyl)-piperidinium iodide were prepared from N-chloro-piperidine, hexene-1 and methyl iodide and the 1-n-butyl-1-(2-chloro-n-hexyl)-piperidinium bromide from N-chloro-pipetridine, hexene-1 and n-butyl bromide.

EXAMPLE 2

Preparation of (2-chloro-n-hexyl)-tri-n-butyl-ammonium bromide

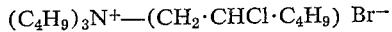

25 g. of N-chloro-di-n-butylamine, 32 g. of hexene-1 and 15 g. of hexahydrate ferric chloride are dissolved in 105 cc. of methanol and treated at a temperature between 0° and −5° C., under agitation and under nitrogen, with a saturated solution of 35 g. of heptahydrate ferrous sulphate in methanol. By working as in Example 1, 24.8 g. of hexene-1 are recovered, and 11.6 g. of dibutylamine and 16.2 g. of 2-chloro-n-hexyl-di-n-butylamine boiling at 108–109°/0.7 mm. Hg are obtained.

10 g. of this amine are heated under reflux, together with 11 g. of butyl bromide in 50 cc. of methanol for 12 hours. After having removed by distillation the solvent and the n-butyl bromide in excess, 12.8 g. of 2-chloro-n-hexyl-tri-n-butylammonium bromide are obtained.

In the same way, the (2-chloro-n-hexyl)-di-n-butyl-benzylammonium chloride has been prepared starting from N-chloro-di-n-butylamine, hexene-1 and benzyl chloride.

EXAMPLE 3

Preparation of 1-(2-chloro-cyclohexyl)-1-methyl-piperidinium iodide

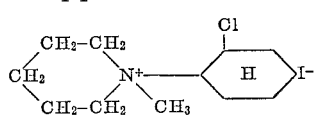

(A) 20 g. of n-chloro-piperidine, 28 g. of cyclohexene and 23 g. of hexanydrato ferric chloride are dissolved in 150 cc. of methanol. To the solution thus obtained, a saturated solution of 30 g. of heptahydrate ferrous sulphate in methanol are added under agitation, at a temperature between 5 and 10° C. and under nitrogen. The separation of the reaction products is carried out as in the Example 1. 14.7 g. of cyclohexane are recovered and 2.5 g. of piperidine together with 26.5 g. of N-(2-chloro-cyclohexyl)-piperidine boiling at 99–100°/1 mm. Hg are obtained.

This product, when treated under reflux with methyl iodide in ethanol, gives 1-(2-chloro-cyclohexyl)-1-methyl-piperidinium iodide with a yield of 90%.

(B) 35 cc. of an aqueous 15% solution of titanium trichloride are added under agitation and cooling under nitrogen, to 20 g. of cyclohexene and 12 g. of N-chloro-piperidine in 100 cc. methanol; the temperature is between 0 and 5° C. The further processing is carried as in (A) above. 14.3 g. of N-(2-chloro-cyclohexyl)-piperidine are obtained which with methyl iodide gives 1-(2-chloro-cyclohexyl)-1-methyl-piperidinium chloride, and with allyl chloride gives 1-allyl-1-(2-chloro-cyclohexyl)-piperidinium chloride with a yield of 92%.

EXAMPLE 4

Preparation of 1-benzyl-1-(2-chloro-cyclohexyl)-morpholinium chloride

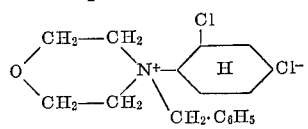

20 g. of N-chloro-morpholine and 55 g. of cyclohexene are introduced in 100 cc. of methanol. Under agitation and under nitrogen, a saturated solution of 40 g. of heptahydrate ferrous sulphate in methanol is introduced. The temperature during the reaction is maintained between 10° and 20° C. By working under the conditions of the preceding example, the cyclohexene in excess (56.4 g.) is recovered and 6.2 g. of morpholine and 16.8 g. of N-(2-chloro-cyclohexyl)-morpholine boiling at 115–116°/1 mm. Hg are obtained. The product thus obtained, when treated as in the preceding examples, with benzyl chloride, gives the 1-benzyl-1-(2-chloro-cyclohexyl)-morpholinium chloride with yields of 93%.

EXAMPLE 5

Preparation of 2-chloro-cyclohexyl-di-n-butyl-methyl-ammonium iodide

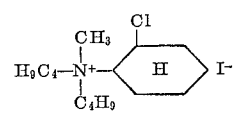

20 g. of N-chloro-di-n-butylamine, 40 g. of cyclohexene and 12 g. of hexahydrate ferric chloride dissolved in 100 cc. of methanol are treated, under agitation and cooling under nitrogen, with 30 g. of heptahydrate ferrous sulphate in saturated methanol solution. Temperature between 0° and 5° C. 35.3 g. of cyclohexene are recovered from the neutral part, while from the basic part, 9.6 g. of dibutylamine and 9 g. of 2-chloro-cyclohexyl-di-n-butyl-amine distilling at 119–120°/0.6 mm. Hg are separated. The product thus obtained, when treated with methyl iodide in ethanol, gives the 2-chloro-cyclohexyl-di-n-butyl-methylammonium iodide with a yield of 92%.

EXAMPLE 6

Preparation of 1-allyl-1-(2-chloro-isoamyl)-piperidinium chloride

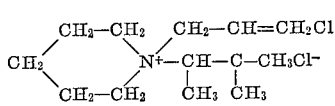

15 g. of N-chloro-piperidine, 18 g. of trimethylethylene (2-methyl-2-butene) and 17 g. of hexahydrate ferric chloride are dissolved in 100 cc. of methanol and treated, under agitation and under nitrogen, with a saturated solution of 30 g. of heptahydrate ferrous sulphate in methanol. The temperature is between −8° and +5° C. By separating the neutral part from the basic part, 11 g. of trimethylethylene are recovered and 2.2 g. of piperidine together with 16.6 g. of N-(2-chloro-isoamyl)-piperidine are obtained, boiling at 75–6°/0.8 mm. Hg. The latter, when treated under reflux in ethanol with allyl chloride, gives 1-allyl-1-(2-chloro-isoamyl)-piperidinium chloride.

EXAMPLE 7

Preparation of quaternary ammonium halides from mixtures of $C_8$–$C_{10}$ α-olefins 12 g. of N-chloro-piperidine, 20 g. of hexahydrate ferric chloride and 25 g. of a commercial product, containing 28% of α-octene, 39% of α-nonene and 21% of α-decene, are introduced in 300 cc. of methanol; the mixture is treated under agitation and under nitrogen, with 23 g. of heptahydrate ferrous sulphate saturated in a methanol solution; temperature between 10 and 20° C. From the neutral part, 16.1 g. of an olefin mixture having about the same composition of the starting mixture is separated. From the basic part, 3 g. of piperidine and 11.8 g. of a mixture of chlorinated amines distilling between 110 and 124° C. at 0.5 mm. Hg are obtained. The basic equivalent corresponds to a mixture containing 31% of N-(2-chloro-octyl)-piperidine, 38% of N-(2-chloro-nonyl)-piperidine, and 18% of N-(2-chloro-decyl)-piperidine. The mixture thus obtained, when treated under reflux with benzyl chloride in ethanol, gives a mixture of quaternary ammonium salts (piperidinium) with a yield of 91%.

EXAMPLE 8

Preparation of quaternary ammonium halides from mixtures of $C_{11}$–$C_{15}$ α-olefins 8 g. of N-chloro-piperidine, 5 g. of hexahydrate ferric chloride and 39 g. of a commercial product, containing a mixture of linear α-olefins ($C_{11}$ 17%, $C_{12}$ 20%, $C_{13}$ 20%, $C_{14}$ 20% and $C_{15}$ 14%), are dissolved in 100 cc. of dioxane and treated, under agitation and under nitrogen, with 15 g. of heptahydrate ferrous sulphate in a saturated methanol solution; temperature between 10 and 20° C. From the neutral part, 34 g. of an olefin mixture is recovered, while from the basic part, 2.9 g. of piperidine and 7.9 g. of a mixture of chlorinated tertiary amines, which with benzyl chloride give a mixture of quaternary ammonium salts (piperidinium) with a yield of 89% are recovered.

EXAMPLE 9

Preparation of 1-allyl-1-(2-chloro-n-pentyl)-piperidinium chloride

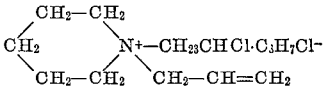

12 g. of N-chloro-piperidine and 17.5 g. of pentene-1 in 100 cc. of methanol are treated, under agitation and under nitrogen, with 10 g. of cuprous chloride, added in little portions at a reaction temperature between 5 and 10° C. From the neutral part, 15 g. of pentene are recovered, while from the basic part, 5 g. of piperidine and 3.1 g. of N-(2-chloro-n-pentyl)-piperidine boiling at 82–83°/1 mm. Hg are obtained. The latter, with allyl chloride in ethanol, gives 1-allyl-1-(2-chloro-n-pentyl)-piperidinium with a yield of 96%.

We claim:
1. 1 - benzyl-1-(2-chloro-n-hexyl)-piperidinium chloride.
2. 1 - methyl-1-(2-chloro-n-hexyl)-piperidinium chloride.
3. 1 - n-butyl-1-(2-chloro-n-hexyl)-piperidinium bromide.
4. (2-chloro-n-hexyl)-tri-n-butylammonium bromide.
5. (2-chloro-n-hexyl)-di-n-butylbenzylammonium chloride.
6. 1 - (2-chloro-cyclohexyl)-1-methyl-piperidinium iodide.
7. 1 - allyl-1-(2-chloro-cyclohexyl)-piperidinium chloride.
8. 1-benzyl-1-(2-chloro-cyclohexyl)-morpholinium chloride.
9. 2 - chloro - cyclohexyl-di-n-butyl-methylammonium iodide.
10. 1-allyl-1-(2-chloro-isoamyl)-piperidinium chloride.
11. 1-allyl-1-(2-chloro-n-pentyl)-piperidinium chloride.

No references cited.

ALEX MAZEL, Primary Examiner

J. TOVAR, Assistant Examiner

U.S. Cl. X.R.

260—293, 567.6; 424—248

PO-1050
(5/69)

UNITED STATES PATENT OFFICE
CERTIFICATE OF CORRECTION

Patent No. 3,562,266      Dated February 9, 1971

Inventor(s) Francesco Minisci et al      F-23569c

It is certified that error appears in the above-identified patent and that said Letters Patent are hereby corrected as shown below:

In the heading to the printed specification, the line which makes reference to the corresponding priority document, was omitted. This line should read:

--Claims priority, application Italy, April 13, 1965, 8194/65--

Signed and sealed this 24th day of August 1971.

(SEAL)
Attest:

EDWARD M. FLETCHER, JR.
Attesting Officer

WILLIAM E. SCHUYLER, JR.
Commissioner of Patents